(12) United States Patent
Mathes et al.

(10) Patent No.: US 7,969,744 B2
(45) Date of Patent: Jun. 28, 2011

(54) MODULE REAR WALL FOR A SWITCHGEAR ASSEMBLY MODULE, SWITCHGEAR ASSEMBLY MODULE AND ELECTRICAL SWITCHGEAR ASSEMBLY

(75) Inventors: Werner Mathes, Frankenthal (DE);
Klaus Kraft, Heidelberg (DE);
Hans-Peter Merkel, Schriesheim (DE);
Klaus-Georg Müller, Wilhelmsfeld (DE)

(73) Assignee: ABB AG, Mannheim (DE)

( * ) Notice: Subject to any disclaimer, the term of this patent is extended or adjusted under 35 U.S.C. 154(b) by 675 days.

(21) Appl. No.: 11/910,467

(22) PCT Filed: Mar. 25, 2006

(86) PCT No.: PCT/EP2006/002765
§ 371 (c)(1),
(2), (4) Date: Jun. 20, 2008

(87) PCT Pub. No.: WO2006/105882
PCT Pub. Date: Oct. 12, 2006

(65) Prior Publication Data
US 2008/0266814 A1 Oct. 30, 2008

(30) Foreign Application Priority Data
Apr. 8, 2005 (DE) .......................... 10 2005 016 545

(51) Int. Cl.
*H05K 7/00* (2006.01)
(52) U.S. Cl. .......................... 361/728; 361/837; 361/673
(58) Field of Classification Search .................. 361/356, 361/673, 728–731, 781, 807–810
See application file for complete search history.

(56) References Cited

U.S. PATENT DOCUMENTS

| 4,369,484 | A | 1/1983 | Fugate et al. |
|---|---|---|---|
| 5,691,686 | A | 11/1997 | Ishikawa et al. |
| 6,639,775 | B1 | 10/2003 | Musiol et al. |
| 6,754,059 | B2 * | 6/2004 | Bach et al. .................. 361/93.1 |
| 2004/0246661 | A1 | 12/2004 | Busch et al. |
| 2006/0056137 | A1 * | 3/2006 | Mueller et al. ................ 361/600 |

FOREIGN PATENT DOCUMENTS

| DE | 297 17 333 (U1) | 1/1998 |
|---|---|---|
| DE | 197 06 019 (A1) | 8/1998 |
| DE | 198 45 799 | 4/2000 |
| DE | 203 04 461 (U1) | 7/2003 |
| EP | 0 109 584 (A) | 5/1984 |
| WO | WO 99/46606 (A2) | 9/1999 |
| WO | WO 01/57979 (A1) | 8/2001 |

OTHER PUBLICATIONS

Form PCT/ISA/210 (International Search Report) dated Jul. 12, 2006.
German Search Report dated Jul. 10, 2006 (with English translation of category of cited documents).

* cited by examiner

*Primary Examiner* — Yuriy Semenenko
*Assistant Examiner* — Andargie M Aychillhum
(74) *Attorney, Agent, or Firm* — Buchanan Ingersoll & Rooney PC (57) ABSTRACT

The invention relates to a modular rear wall for a switching system module, in particular an insertion module. Said modular rear wall comprises a measuring device which is integrated therein and which forms an integral component of the switching system module. The invention also relates to a switching circuit module which comprises said type of modular rear wall, in addition to a switching system comprising at least one switching system module having a modular rear wall.

20 Claims, 9 Drawing Sheets

MODULE REAR WALL FOR A SWITCHGEAR ASSEMBLY MODULE, SWITCHGEAR ASSEMBLY MODULE AND ELECTRICAL SWITCHGEAR ASSEMBLY

The invention relates to a module rear wall having a measuring device for a, switchgear assembly module of an electrical switchgear assembly, in particular a withdrawable module, having the features of claim 1 and to a switchgear assembly module having such a module rear wall and an electrical switchgear assembly, in particular a medium-voltage or low-voltage switchgear assembly, having at least one switchgear assembly module having a module rear wall according to the invention.

Continuously increasing and often changing demands in the processing industry and in electrical engineering bring about the need for the use of medium-voltage and low-voltage switchgear assemblies which can be converted and maintained as simply as possible. Current assemblies in this regard generally have a plurality of switchgear cabinets which are designed using withdrawable part technology and are comparatively easy to fit with components and to configure. Withdrawable part technology in this context means that all the electrical operating means and electrical devices, such as control and/or measuring devices installed as components, for example, are preferably arranged on modularized withdrawable parts.

Advantageous here is the simplified accessibility of the respective withdrawable module by virtue of the fact that, if required, for example in the event of a, fault or of a failure, but also in the event of the respective switchgear assembly being reconfigured, this withdrawable module can be removed easily from the respective switchgear cabinet and replaced by a suitable module.

Disadvantageously, however, the control and/or measuring devices installed are in general conventional, generally available electrical and electronic components which have not been adapted for use in withdrawable part technology and which often require a comparatively large amount of space in the respective switchgear assembly module owing to their arrangement and design and cause increased configurational complexity. In the context of repair and servicing measures, this then usually also results in longer maintenance times and downtimes.

Furthermore, the increased amount of space required for the abovementioned components often necessitates physical overdimensioning of the actual switchgear assembly module since, owing to the specific arrangement and geometry of the individual components (a module can only be as small as its largest component), a large proportion of the converted space is usually unusable.

The object of the invention is to specify, for a given functionality, a switchgear assembly module having a measuring device with simplified handling and improved utilization of space.

This object is achieved by a switchgear assembly having the features of claim 10, a switchgear assembly module having the features of claim 9 and a module rear wall having the features of claim 1.

The electrical switchgear assembly according to the invention in this case has at least one switchgear assembly module, in particular a withdrawable module, having a module rear wall having an integrated measuring device, the module rear wall also being an integral part of the respective switchgear assembly module.

With the aid of the module rear wall according to the invention, which is matched to the respective size requirements of the module technology and has an integrated measuring device, it is now possible to make best possible use of the space available in the switchgear assembly module in question. Furthermore, handling of the respective switchgear assembly module and therefore of the electrical switchgear assembly is also improved and simplified by virtue of the fact that, if required, in the event of a fault and/or in the event of maintenance or servicing work on the measuring device, only the module rear wall according to the invention needs to be replaced, without the remaining components and internals of the respective switchgear assembly module being affected. It is therefore possible to insert the switchgear assembly module in the electrical switchgear assembly correctly again as quickly as possible merely by changing the module rear wall.

The measuring device integrated in the module rear wall in this case advantageously comprises at least one outgoing contact having means for integrated measured-variable detection and/or measured-variable preprocessing as well as possibly one or more outgoing contacts without measured-variable detection and/or measured-variable preprocessing.

Furthermore, the measuring device of the module rear wall preferably has at least one access contact.

In a further embodiment, the measuring device has at least one transmission unit for measured data transmission, it being possible to provide for at least one interface to be provided, by means of which the detected and/or preprocessed measured data are made available for callup.

The at least one interface may in this case be, in particular, an interface which can be read by a correspondingly set-up data processing device, for example an RS-232, RS485/RS422 and/or a USB interface. It is also advantageously possible to provide conventional power links or bus links for reading or calling up the detected and/or preprocessed measured data via a corresponding bus system or control system and/or via a local or global network, in particular the Internet, for example for the purpose of a remote diagnosis. As an alternative to this, interfaces for wireless information transmission to a corresponding control system or bus system and/or a data processing device set up for this purpose, for example by means of wireless LAN (WLAN) or Bluetooth, can also be provided.

An, interface for voltage supply, for example for supplying the means for integrated measured-variable detection and/or measured-variable preprocessing, can likewise be provided, in an alternative configuration it also being possible for a common interface for data transmission and voltage supply to be provided.

The invention will be described further with reference to some figures and exemplary embodiments.

Figure 1:
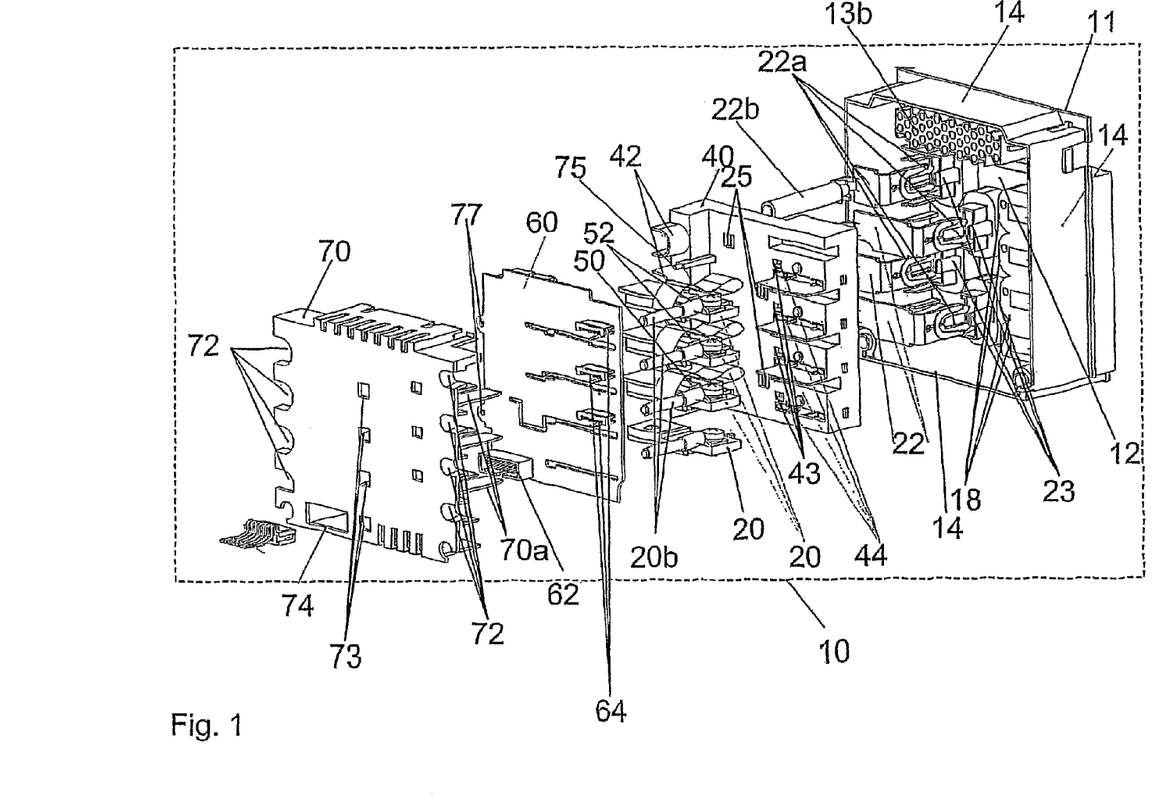
FIG. 1 shows an exploded illustration of a module rear wall with an exemplary configuration for a switchgear assembly module.

The invention, advantageous configurations and improvements of the invention and particular advantages of the invention will be explained and described in more detail with reference to the exemplary embodiments of the invention illustrated in the attached drawings, in which:

FIG. 1 shows a module rear wall 10 with an exemplary configuration and having an integral measuring device 24 for a withdrawable module for an electrical switchgear assembly, in an exploded illustration.

The module rear wall 10 shown is in this case an integral part of the respective switchgear assembly module and contributes to the formation of the module housing.

The module rear wall 10 comprises a rear wall element 11 in the form of a trough and having a trough base 12 and four side walls 14. The trough base 12, whose outer side forms the rear side 16 of the module rear wall 10, in this case has a virtually rectangular to square cross-sectional area. The trough base 12 of the rear wall element 11 has a plurality of sockets with cutouts 18 for accommodating and passing through outgoing contacts 20 and/or input contacts 22 of the measuring device. In the example shown here, in total eight sockets with cutouts 18 are provided for in each case four input contacts 22 and four output contacts 20.

The module rear wall 10 as well as the trough-like rear wall element 11 have, on their side walls 14, means which allow for the module rear wall 10 to be connected to the rest of the module housing, for example in the form of hooks and/or catches 30 in order to make it possible for them to be latched into eyelets or cutouts in the rest of the module housing, or vice versa. The module housing and the module rear wall 10 in this case each have complementary connecting means, i.e. ones which complete one another.

Furthermore, the rear wall element 11 is prepared for accommodating a multi-pole connection or plug by means of a corresponding connection element 13b.

The module rear wall 10 comprises an integrated measuring device, which in this case comprises, for example, a plurality of components, which are crucially arranged in the trough interior of the rear wall element 11. The rear wall element 11 and the components of the measuring device have connecting elements 23, 25, for example catches or hooks 23 and cutouts 25 and eyelets which correspond in complementary fashion, in order to, in the installed state, enter into a connection with one another that is secured against becoming detached unintentionally and form, as integral parts, one unit, the module rear wall 10.

Starting from the trough base inner side of the rear wall element 11, the measuring device has a plurality of input contacts 22. Each of the four input contacts 22 shown here has a clamp-like contact end 22a, which passes through the sockets 18, which are provided for this purpose, of the trough base 12 of the rear wall element 11, and a finger-like contact end 22b, which extends into the trough interior of the rear wall element 10. This is correspondingly shown in FIG. 6 in a perspective plan view of the rear wall element 11, in the viewing direction from the right.

As further components, the measuring device comprises a plastic partition 40 between the input contacts 22 and the outgoing contacts 20 in order to insulate or shield them electrically from one another and therefore avoid the risk of short circuits. The plastic partition 40 is in the form of a hood and almost completely covers at least the sockets 18 for accommodating the input contacts 22. Cutouts with integral formations 42 for passing through and guiding the finger-like contact ends 22b of the input contacts 22 are provided in the plastic partition 40. Furthermore, the plastic partition 40 has cutouts with integral formations 44 for arranging and guiding as well as passing the outgoing contacts 20 through the sockets 18, which are provided for this purpose, of the trough base 12 of the rear wall element 11. This is correspondingly shown in FIG. 7 in a perspective plan view of the rear wall element 11, in the viewing direction from the right.

Figure 8:
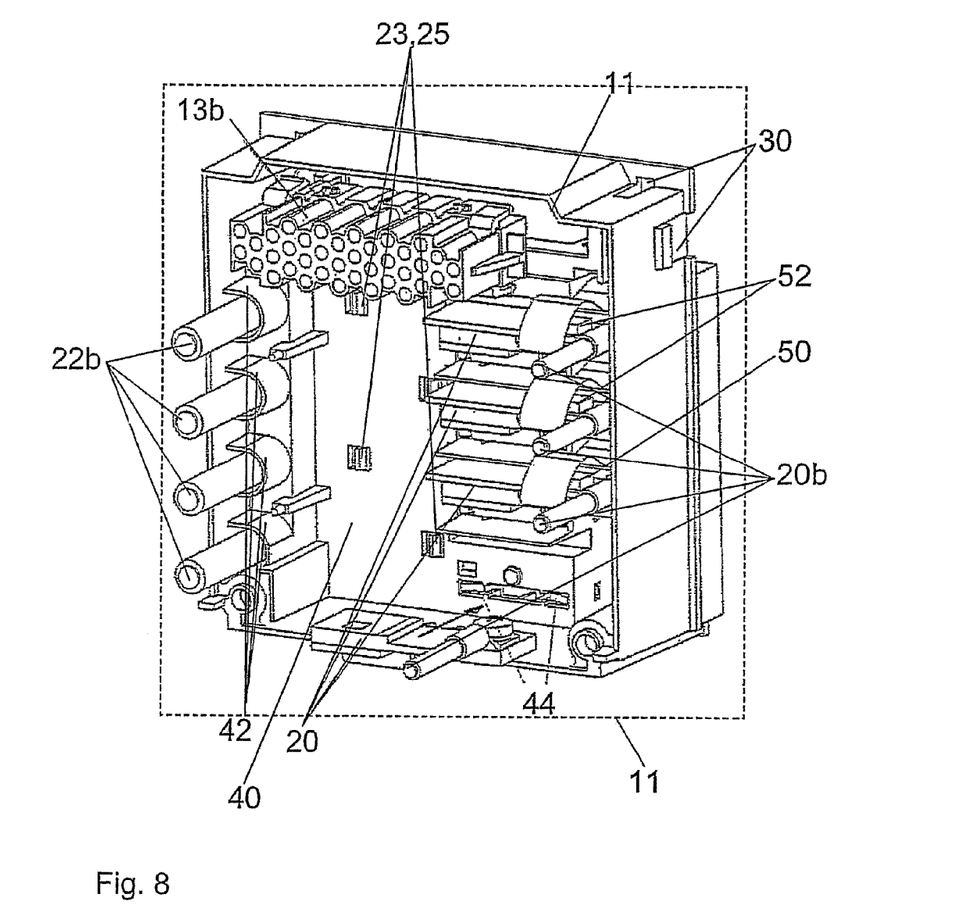
FIG. 8 shows a perspective illustration of the module rear wall with the exemplary configuration shown in FIG. 1 and having a measuring device with a, rear wall element, input contacts, a partition and outgoing contacts, and, FIG. 9 shows a perspective illustration of the module rear wall with the exemplary configuration shown in FIG. 1 and having a measuring device with a rear wall element, input contacts, a partition, outgoing contacts and a transmission unit.

Each of the four outgoing contacts 20 shown here in this case also has a clamp-like contact end 20a, which passes through the sockets 18, which are provided for this purpose, of the trough base 12 of the rear wall element 11 and up to the rear side 16 thereof, as well as a finger-like contact end 20b, which extends into the wall interior of the rear wall element 11, as can also be seen from FIG. 8, in a perspective plan view of the rear wall element 11 with input contacts 22, a partition 40 and outgoing contacts 20, in the viewing direction from the right.

Three of the four outgoing contacts 20 shown furthermore have means for measured-variable detection 50 and/or measured-variable preprocessing 52, for example for filtering and/or amplifying but possibly also for the mean-value generation of the measured data detected.

Figure 9:
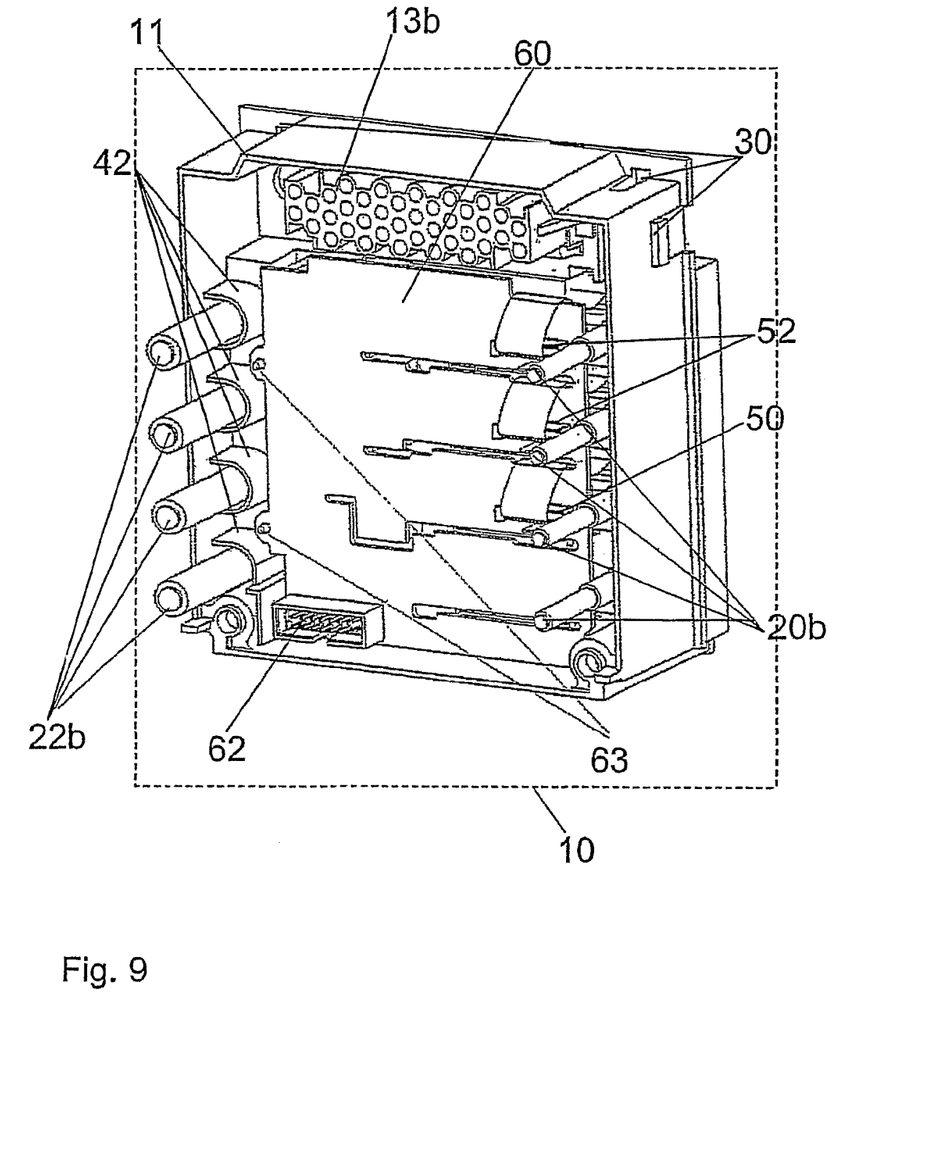

A transmission unit 60 for transmitting measured data and/or information is provided as a further component of the measuring device, this transmission unit in this case being in the form of, for example, a transmission board populated suitably and with corresponding components. The transmission unit 60 advantageously comprises at least one preconfigurable interface 62, by means of which the detected and/or preprocessed measured data are made available for callup. Making the measured data available in this case takes place by accessing the corresponding outgoing contacts 20 and/or their means for measured-variable detection 50 and/or measured-variable preprocessing 52, as is also indicated in FIG. 9, in a perspective plan view of the rear wall element 11, in the viewing direction from the right.

The at least one preconfigurable interface 62 may in this case be, in particular, an interface which can be read by suitable data processing devices, for example an RS-232, RS485/RS422 and/or a USB interface, but it is also advantageously possible to provide conventional power links or bus links, such as, for example, an Ethernet interface, for reading the relevant status information via a corresponding bus system or control system and/or via a local or global network. As an alternative to this or in addition to this, at least one interface for wireless information transmission to a corresponding control system and/or a data processing device set up for this purpose, for example by means of wireless LAN (WLAN) or Bluetooth, can also be provided.

In addition, the transmission unit 60 has an interface for voltage supply, for example for supplying the transmission board and its components and/or the means for measured-variable detection 50 and/or measured-variable preprocessing 52 itself, which interface can be coupled to or combined with the interface for data transmission.

Furthermore, the transmission unit 60 shown in FIG. 1 has integral formations with cutouts 64 for access through to the outgoing contacts 20 and/or their means for measured-variable detection 50 and/or measured-variable preprocessing 52.

Finally, a cover 70 with integral formations 70a for passing through the cutouts 64 of the transmission unit 60 for isolating the phases as well as clearances 72 for passing through the input contacts 22 and the outgoing contacts 20 as well as a cutout 74 for access to the interface 62 of the measuring device 24 is also provided, which cover partitions the measuring device off from the interior of the respective switchgear assembly module and protects it against contamination and damage, in particular during fitting.

The trough-like rear wall element 11 also has, in the region of the trough base 12 in the trough interior, further connecting means 23, which allow for the rear wall element 11 to be connected to the measuring device 24 and/or for individual components 40 of the measuring device 24 to be connected to one another, for example in the form of hooks and/or catches 23 in order to make it possible for them to latch into eyelets or cutouts. A screw connection between the measuring device 24 and the rear wall element 11 and/or between individual components of the measuring device 24 can in principle be provided. The rear wall element 11 and the partition 40 therefore latch with one another via the complementary connecting means, the catches 23 and the cutouts 25, as a result of which the input contacts are fixed in their installed position. Furthermore, the partition 40 and the plastic cover 70 latch with one another via, the complementary connecting means, the catches 73 and the cutouts or windows 43, as a result of which both the transmission unit 60 and the outgoing contacts 20 are fixed in their installed position. In addition, installation aids 75, 77 for installing and fixing the transmission unit 60 are provided.

Advantageously, the rear wall element 11, the partition 40 and the cover 70 are formed from plastic, in particular from electrically nonconductive plastic.

Figure 2:
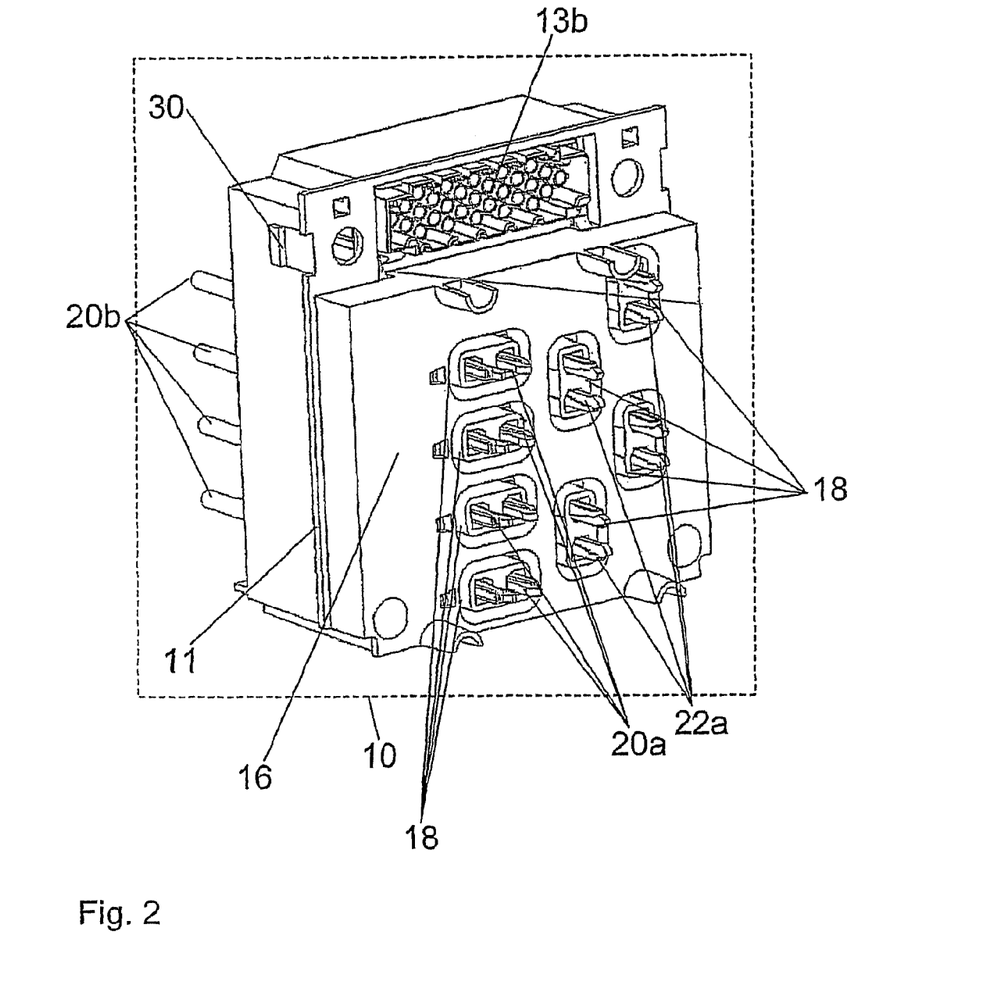
FIG. 2 shows a perspective illustration of the rear view of the module rear wall with the exemplary configuration shown in FIG. 1.

FIG. 2 shows the module rear wall 10 with the exemplary configuration shown in FIG. 1, in a rearward perspective illustration in the viewing direction from the left. In this case, the clamp-like contact ends 20a, 22a of the input contacts 22 and the outgoing contacts 20 as well as the associated sockets with the cutouts 18 in the outer side or rear side 16 of the trough base 12 of the rear wall element 11 are indicated. Likewise indicated are the finger-like contact ends 20b of the outgoing contacts 20. Furthermore, centering devices 11a and 11b for guiding the module rear wall into a corresponding accommodating apparatus and/or adapter unit (not illustrated) are located on the rear side of the rear wall element 11.

Figure 3:
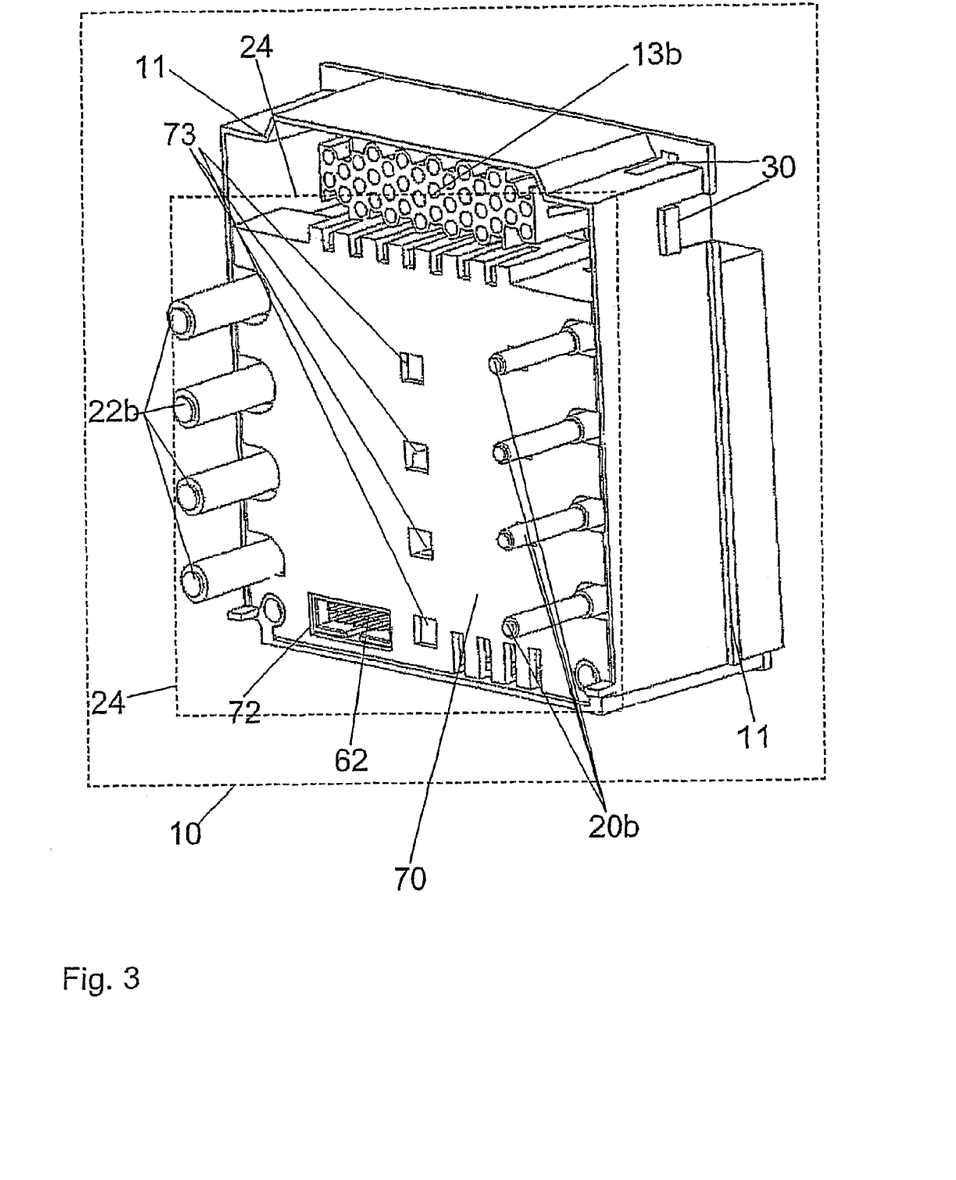
FIG. 3 shows a perspective illustration of the front view of the module rear wall with the exemplary configuration shown in FIG. 1.

FIG. 3 shows the module rear wall 10 with the exemplary configuration shown in FIG. 1, in a perspective illustration in the viewing direction into the trough interior from the right. In this case, the trough-like rear wall element 11, the preconfigurable interface 62 of the measuring device 24, the finger-like contact ends 20b, 22b of the input contacts 22 and the outgoing contacts 20 as well as the plastic cover 70 are indicated.

Figure 4:
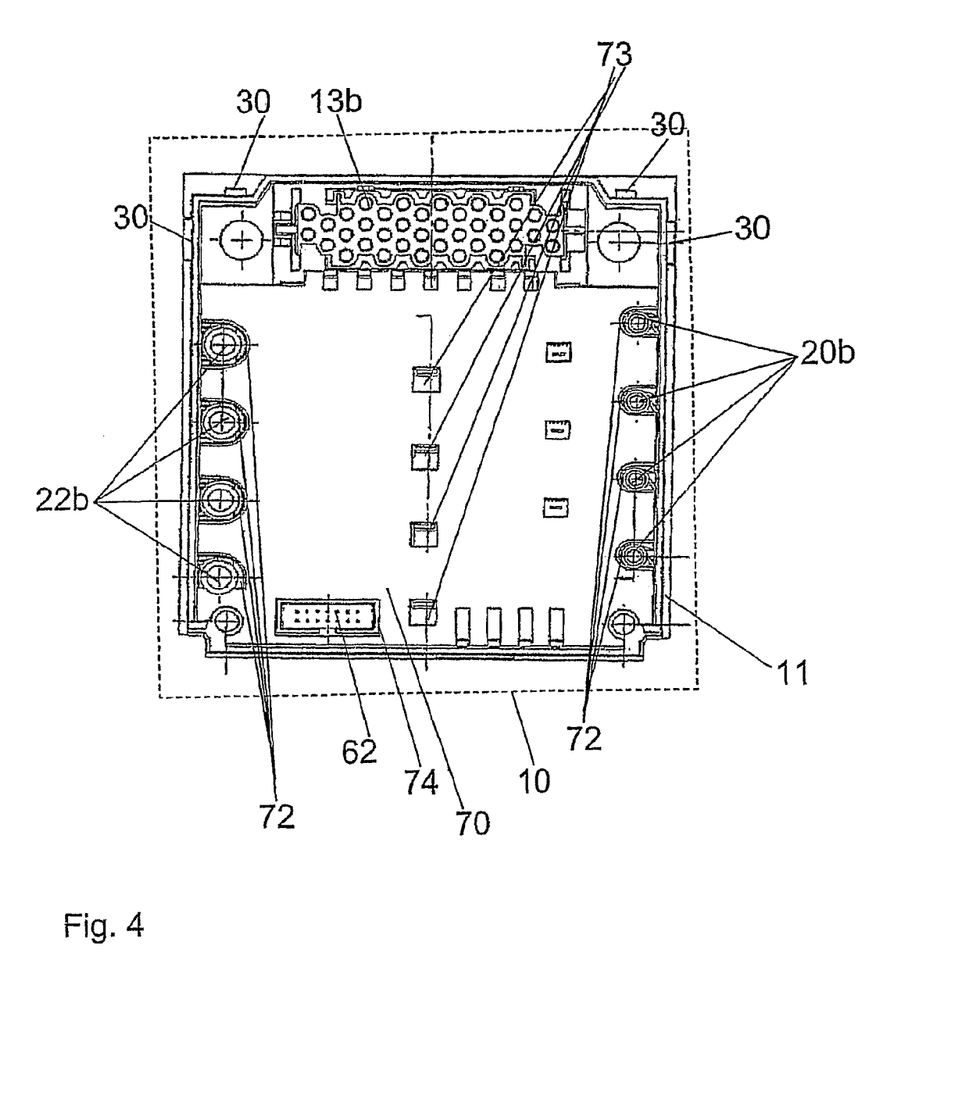
FIG. 4 shows a frontal illustration of the module rear wall with the exemplary configuration shown in FIG. 1.

FIG. 4 shows the module rear wall 10 with the exemplary configuration shown in FIG. 1, in the viewing direction into the trough interior onto the measuring device 24, the preconfigurable interface 62 of the measuring device 24, the finger-like contact ends 20h, 22b of the input contacts 22 and the outgoing contacts 20 as well as the plastic cover 70 with the clearances 72 for passing through the input contacts 22 and the outgoing contacts 20 as well as a cutout 74 as a connection possibility and for access to the interface 62.

Figure 5:
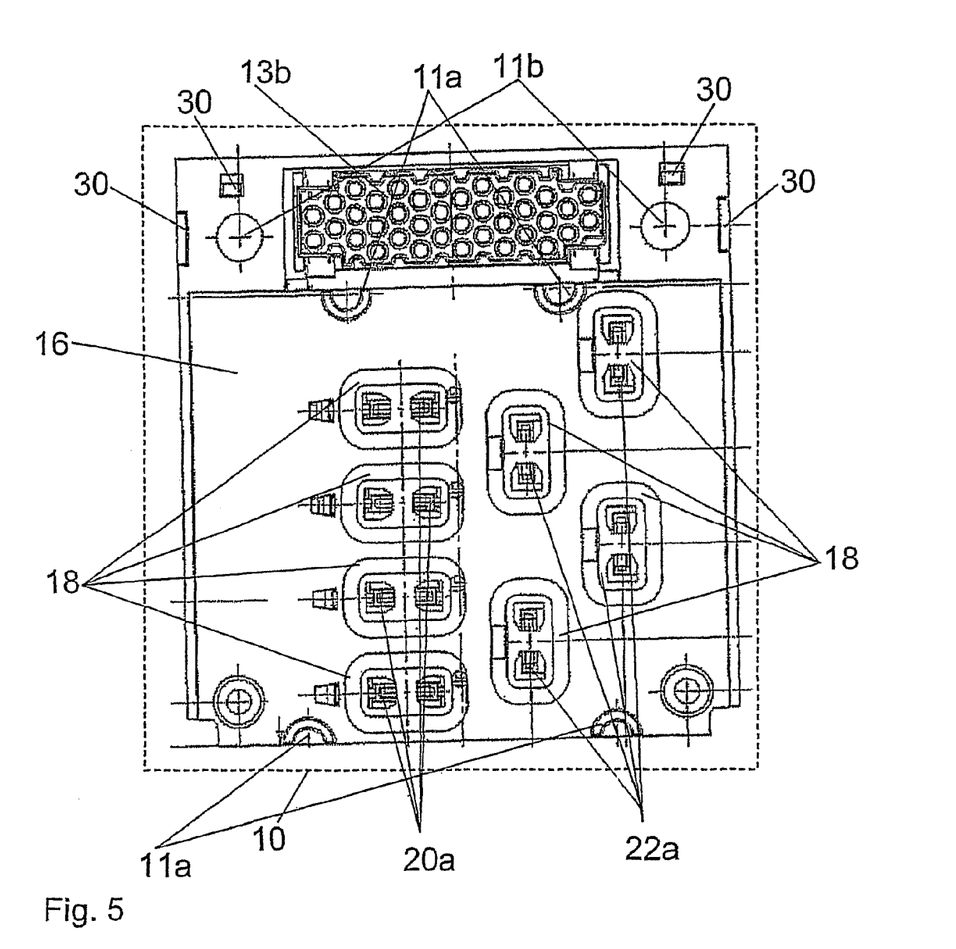
FIG. 5 shows a, rearward illustration of the module rear wall with the exemplary configuration shown in FIG. 1.

FIG. 5 shows the module rear wall 10 with the exemplary configuration shown in FIG. 1, in a rearward view, in which case the rear side 16 of the rear wall element 11 has sockets and cutouts 18 for accommodating and passing through the clamp-like contact ends 20b, 22b of the input contacts 22 and the outgoing contacts 20.

Figure 6:
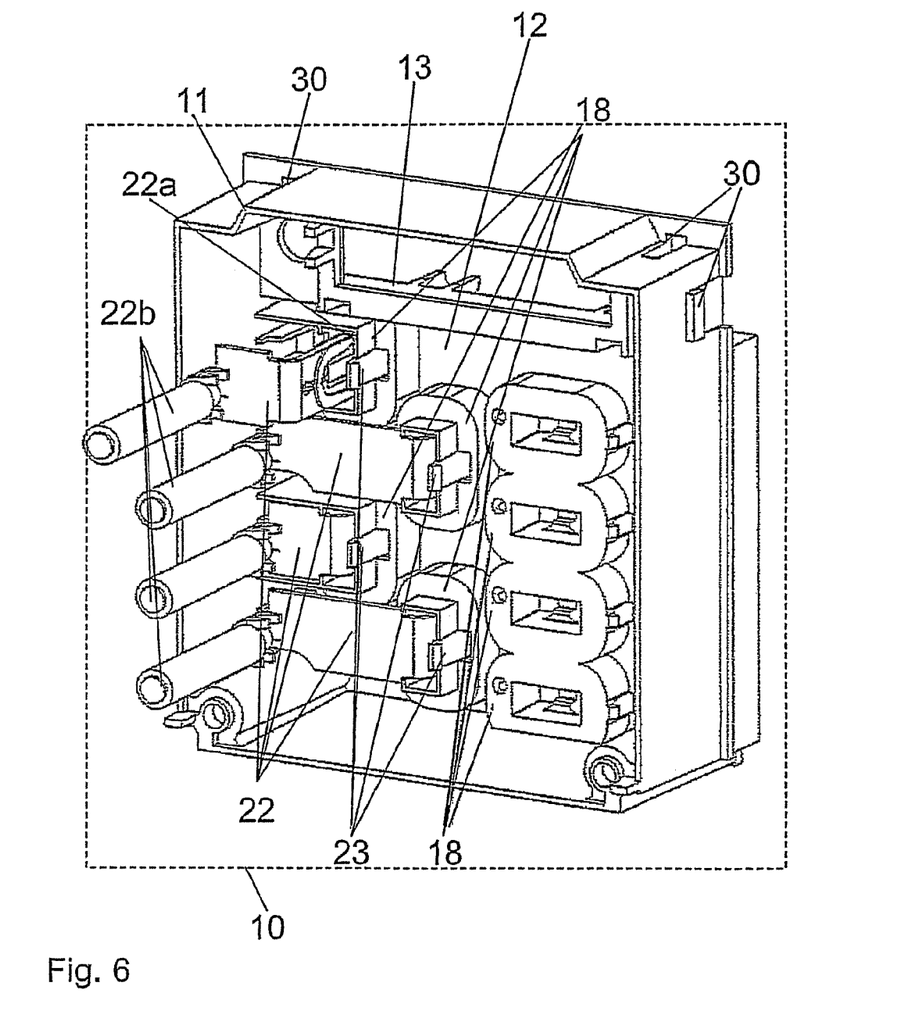
FIG. 6 shows a perspective illustration of the module rear wall with the exemplary configuration shown in FIG. 1 and having a measuring device with a rear wall element and input contacts.

FIG. 6 shows the module rear wall 10 with the exemplary configuration shown in FIG. 1, with the input contacts 22 installed with sockets with cutouts 18 for passing through and guiding the finger-like contact ends 22b of the input contacts 22, in a perspective illustration in the viewing direction onto the trough inner side from the right. Furthermore, the rear wall element 11 is prepared for accommodating a connection element 13b for a multi-pole plug by means of a cutout 13.

Figure 7:
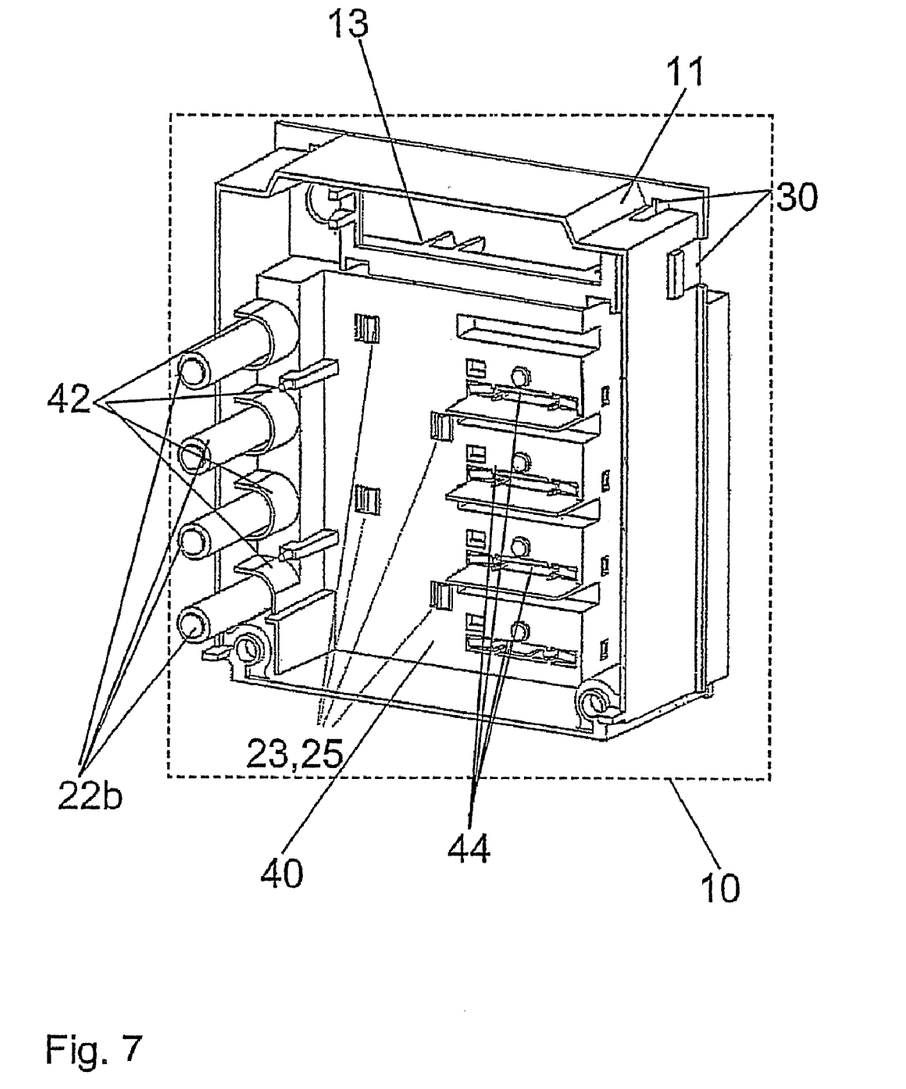
FIG. 7 shows a perspective illustration of the module rear wall with the exemplary configuration shown in FIG. 1 and having a measuring device with a rear wall element, input contacts and a partition.

FIG. 7 shows the module rear wall 11 with the exemplary configuration shown in FIG. 1, with the plastic partition 40 installed between the input contacts 22 and the outgoing contacts 20 with cutouts with integral formations 42 for passing through and for guiding the finger-like contact ends 22b of the input contacts 22, in a perspective illustration in the viewing direction onto the trough inner side from the right.

FIG. 8 shows the module rear wall 11 with the exemplary configuration shown in FIG. 1, with the plastic partition 40 installed between the input contacts 22 and the outgoing contacts 20 with cutouts with integral formations 42 for passing through and for guiding the finger-like contact ends 22b of the input contacts 22 as well as three installed outgoing contacts and, one which is intended to be installed, in a perspective illustration in the viewing direction onto the trough inner side from the right.

FIG. 9 shows the module rear wall 11 with the exemplary configuration shown in FIG. 1, with the plastic partition 40 installed between the input contacts 22 and the outgoing contacts 20 with cutouts with integral formations 42 for passing through and for guiding the finger-like contact ends 22b of the input contacts 22 as well as four installed outgoing contacts and the transmission unit 60 with a preconfigurable interface 62, in a perspective illustration in the viewing direction onto the trough inner side from the right.

The invention claimed is:

1. A module rear wall for a switchgear assembly module, comprising:
    a rear wall element having a plurality of sockets; and
    a withdrawable module having a measuring device that includes a plurality of modules,
    wherein a first module includes plural contacts that are each detachably connected to one of the sockets of the rear wall element and each other module of the measuring device includes cutouts through which the plural contacts of the first module pass,
    wherein the measuring device is integrated in the module rear wall, and the module rear wall forms an integral part of the switchgear assembly module.

2. The module rear wall as claimed in claim 1, wherein the first module of the measuring device has at least one outgoing contact having means for integrated measured-variable detection and/or measured-variable preprocessing.

3. The module rear wall as claimed in claim 2, wherein the first module of the measuring device has at least one outgoing contact without measured-variable detection and/or measured-variable preprocessing.

4. The module rear wall as claimed in claim 2, wherein the first module of the measuring device has at least one input contact.

5. The module rear wall as claimed in claim 2, wherein a second module of the measuring device has at least one transmission unit for measured data transmission.

6. A switchgear assembly module, in particular a withdrawable module, having a module rear wall as claimed in claim 2.

7. The module rear wall as claimed in claim 1, wherein the first module of the measuring device has at least one outgoing contact without measured-variable detection and/or measured-variable preprocessing.

8. The module rear wall as claimed in claim 7, wherein the first module of the measuring device has at least one input contact.

9. The module rear wall as claimed in claim 7, wherein a second module of the measuring device has at least one transmission unit for measured data transmission.

10. The module rear wall as claimed in claim 1, wherein the first module of the measuring device has at least one input contact.

11. The module rear wall as claimed in claim 10, wherein a second module of the measuring device has at least one transmission unit for measured data transmission.

12. The module rear wall as claimed in claim 1, wherein a second module of the measuring device has at least one transmission unit for measured data transmission.

13. The module rear wall as claimed in claim 12, wherein the transmission unit has at least one interface, by means of which the detected and/or preprocessed measured data are made available for callup.

14. The module rear wall as claimed in claim 13, wherein the transmission unit has at least one interface for voltage supply.

15. The module rear wall as claimed in claim 13, wherein the transmission unit has at least one common interface for data transmission and voltage supply.

16. The module rear wall as claimed in claim 12, wherein the transmission unit has at least one interface for voltage supply.

17. The module rear wall as claimed in claim 16, wherein the transmission unit has at least one common interface for data transmission and voltage supply.

18. The module rear wall as claimed in claim 12, wherein the transmission unit has at least one common interface for data transmission and voltage supply.

19. A switchgear assembly module, in particular a withdrawable module, having a module rear wall as claimed in claim 1.

20. An electrical switchgear assembly, in particular a low-voltage or medium-voltage switchgear assembly, having at least one switchgear assembly module as claimed in claim 19.

* * * * *